US009916537B2

(12) United States Patent
Riquelme Ruiz et al.

(10) Patent No.: US 9,916,537 B2
(45) Date of Patent: Mar. 13, 2018

(54) SMART OFFICE DESK INTERACTIVE WITH THE USER

(71) Applicant: PYNK SYSTEMS, S.L., Madrid (ES)

(72) Inventors: Carlos Riquelme Ruiz, Madrid (ES); David Mata Valdes, Madrid (ES)

(73) Assignee: PYNK SYSTEMS, S.L., Madrid (ES)

( * ) Notice: Subject to any disclaimer, the term of this patent is extended or adjusted under 35 U.S.C. 154(b) by 555 days.

(21) Appl. No.: 14/636,216

(22) Filed: Mar. 3, 2015

(65) Prior Publication Data

US 2016/0260019 A1    Sep. 8, 2016

(51) Int. Cl.
| | |
|---|---|
| *A47B 11/00* | (2006.01) |
| *A47B 21/00* | (2006.01) |
| *G06N 5/04* | (2006.01) |
| *A47B 21/007* | (2006.01) |
| *A47B 21/02* | (2006.01) |
| *A47B 37/00* | (2006.01) |
| *A47B 91/02* | (2006.01) |
| *A47B 95/00* | (2006.01) |

(Continued)

(52) U.S. Cl.
CPC ............... *G06N 5/045* (2013.01); *A47B 9/00* (2013.01); *A47B 21/007* (2013.01); *A47B 21/02* (2013.01); *A47B 37/00* (2013.01); *A47B 91/02* (2013.01); *A47B 95/00* (2013.01); *A47B 97/00* (2013.01); *G06F 1/16* (2013.01); *G06F 3/016* (2013.01); *G06F 3/0488* (2013.01); *G06N 99/005* (2013.01); *A47B 2021/0076* (2013.01); *A47B 2097/006* (2013.01); *A47B 2200/0043* (2013.01); *A47B 2200/0062* (2013.01);

(Continued)

(58) Field of Classification Search
CPC ...................................................... A47B 21/00
See application file for complete search history.

(56) References Cited

U.S. PATENT DOCUMENTS

| | | | |
|---|---|---|---|
| 4,920,458 A | * | 4/1990 Jones | ................... A47B 83/001 248/917 |
| 5,107,774 A | | 4/1992 Allen | |

(Continued)

FOREIGN PATENT DOCUMENTS

JP      2004230108 A     8/2004

OTHER PUBLICATIONS

International Search Report dated May 27, 2016 for PCT/EP2016/054520.
Written Opinion dated May 27, 2016 for PCT/EP2016/054520.

*Primary Examiner* — Ronald Hartman, Jr.
(74) *Attorney, Agent, or Firm* — Lucas & Mercanti, LLP

(57) ABSTRACT

A smart office desk interactive with the user, defined on the basis of an individual work desk (M) and various hardware and software elements applied to it and whose main hardware components comprise a working desktop divided into two zones, one which can be raised at an angle, motor-driven legs which raise and lower the desktop, a footrest tray and a series of sensors integrated into the desktop structure and in the legs.

The smart office desk learns from the user by machine learning algorithms, and proposes physical actions in accordance with what has been learned. The table collects information from the user concerning their postures and working habits, using various physical sensors, and by their interactions with the software application displayed onscreen.

It is thus a table controlled by a computer system which receives data on the user and the working environment as inputs. The system's outputs take the form of recommendations made to the user, automatic implementation of actions on them, and statistics the user can consult about their daily work.

1 Claim, 2 Drawing Sheets

(51) Int. Cl.
  *A47B 97/00* (2006.01)
  *G06F 1/16* (2006.01)
  *G06F 3/01* (2006.01)
  *G06F 3/0488* (2013.01)
  *G06N 99/00* (2010.01)
  *A47B 9/00* (2006.01)

(52) U.S. Cl.
  CPC .......... *A47B 2200/0079* (2013.01); *A47B 2200/0097* (2013.01)

(56) References Cited

U.S. PATENT DOCUMENTS

| | | | |
|---|---|---|---|
| 5,765,910 | A | 6/1998 | Larkin et al. |
| 6,286,440 | B1 * | 9/2001 | Jyringi ............ A47B 21/00 108/50.01 |
| 6,360,675 | B1 * | 3/2002 | Jones ............ A47B 9/00 108/50.02 |
| 2002/0020329 | A1 | 2/2002 | Kowalski |
| 2013/0331993 | A1 * | 12/2013 | Detsch ............ G05B 15/02 700/275 |
| 2014/0020606 | A1 | 1/2014 | Benden |
| 2014/0208986 | A1 * | 7/2014 | DesRoches ............ A47B 9/20 108/22 |
| 2016/0113389 | A1 * | 4/2016 | DesRoches ............ A47B 9/20 700/275 |
| 2016/0128467 | A1 * | 5/2016 | Sigal ............ A47B 9/00 700/275 |
| 2016/0270528 | A1 * | 9/2016 | Scharing ............ A47B 21/03 |
| 2017/0042322 | A1 * | 2/2017 | Labrosse ............ A47B 21/02 |
| 2017/0052517 | A1 * | 2/2017 | Tsai ............ A47B 9/00 |
| 2017/0135587 | A1 * | 5/2017 | DesRoches ............ A47B 9/20 |

* cited by examiner

SMART OFFICE DESK INTERACTIVE WITH THE USER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION
TECHNICAL FIELD

The field of the invention is that of the office furnishings industry, especially with interactive elements. It is also associated with the development of artificial intelligence algorithms and the application of machine learning to office ergonomics and productivity.

DESCRIPTION OF THE RELATED ART

Improved efficiency at the workstation, whether through ergonomics or work time planning according to users' habits and tasks, has been dealt with in a number of studies.

One of the first references encountered was a study of the detection and improvement of potentially-harmful postures using non-intrusive sensors and applying machine learning to the received data, for the classification purposes, in order to avoid chronic illnesses in dentists. (Haveman, S., & Kant, G., "Smart monitoring of worker posture in an office environment.")

Likewise, detection and correction of posture was dealt with in a second study, by Mirc̆evska, V., Luštrek, M., & Gams, M. "Combining machine learning and expert knowledge for classifying human posture" in this case by applying pressure sensors in the seat and by analysing the effectiveness of the work, and classifying it using various learning algorithms.

There are also studies which deal with the influence of parameters in the environment, such as temperature, humidity, light and noise, in worker productivity, e.g. Trifonova, T.; Markova, V.; Draganov, V.; Angelova, V.; Dimitrov, V., "Smart sensor network for ergonomic evaluation of working environment".

In the field of occupational health, numerous studies have shown the relationship between backbone angle and various illnesses caused by erroneous postures during years of work with a computer.

With respect to industrial applications in the fields of ergonomics and worktime planning, the state-of-the-art regarding the field of the invention is classified into three families depending on the elements they incorporate:

a. That referring to ergonomics (3):

a.1. U.S. Pat. No. 7,315,249, dealing with the monitoring of posture in different occupational scenarios, using a camera focused on the user.

a.2. U.S. Pat. No. 6,931,387 claiming use of the know-how acquired from data gathered to avoid illnesses and ailments using machine learning.

a.3. And finally, U.S. Pat. No. 8,024,202, consisting of a system to detect "erroneous" occupational postures in real time and which generates an output displayed to the user through an audiovisual device to correct a posture found to be the source of an ailment.

b. A patent referring to decision-making on physical parameters in the work environment (1):

b.1. U.S. Pat. No. 7,797,771, deals with improvements to individuals in their working space by means of variable changes in their individual area (height, angle, etc) and the structuring of their surroundings.

c. That referring to the planning of rest-times from work (2):

c.1. Patent US200900307677 which accepts the first claim referring to the planning of rest-time based on factors in the surroundings, and claim nineteen which associates increased productivity following compliance with recommended rest-times.

c.2. U.S. Pat. No. 7,318,040 also granted rights concerning the planning of work times based on an external digital schedule (claim 1).

On the other hand, reference is also made to Patent US20060184410 dealing with all the inputs from the working environment and the interaction of the user with his computer, in order to apply it to Business Intelligence.

Although following thorough the study of the mentioned documents the conclusion has been reached that while these examples might be considered to be remote prior art of the invention, none of them formally anticipates the embodiment of the invention proposed, for the following reasons:

i) none of the inventions consists of an ergonomic work desk with automated movement of any of its components.

ii) none of the cases cited makes use of Artificial Intelligence algorithms with sensor data applied to the individual to create patterns of use.

iii) in none of the cases cited are breaks recommended to the user, nor the height and the position of the components at the work station changed over time in accordance to conclusions drawn by the algorithms from the system in the invention.

The inventors are unaware of any prior invention, which incorporates the provisions presented in this invention, nor the advantages it implies.

BRIEF SUMMARY OF THE INVENTION

The invention these specifications refer to is a smart office desk which is interactive with the user and which has a series of mobile elements operated by an artificial intelligence system fed by dynamic sensors which gather data directly from the user's conduct at the work station.

The system gathers a multiplicity of data concerning the user's working posture and habits and recommends a customised work programme displayed on a built-in screen and which is run by operating the motor-driven parts of the desk: legs, desktop and footrest.

BRIEF DESCRIPTION OF THE DRAWINGS

For a better understanding of the invention, a page of plans is attached showing the following FIG. 1
A diagram of the desk (M) and its components
FIG. 2
A diagram of the system as a whole

DETAILED DESCRIPTION OF THE INVENTION

Figure 1:
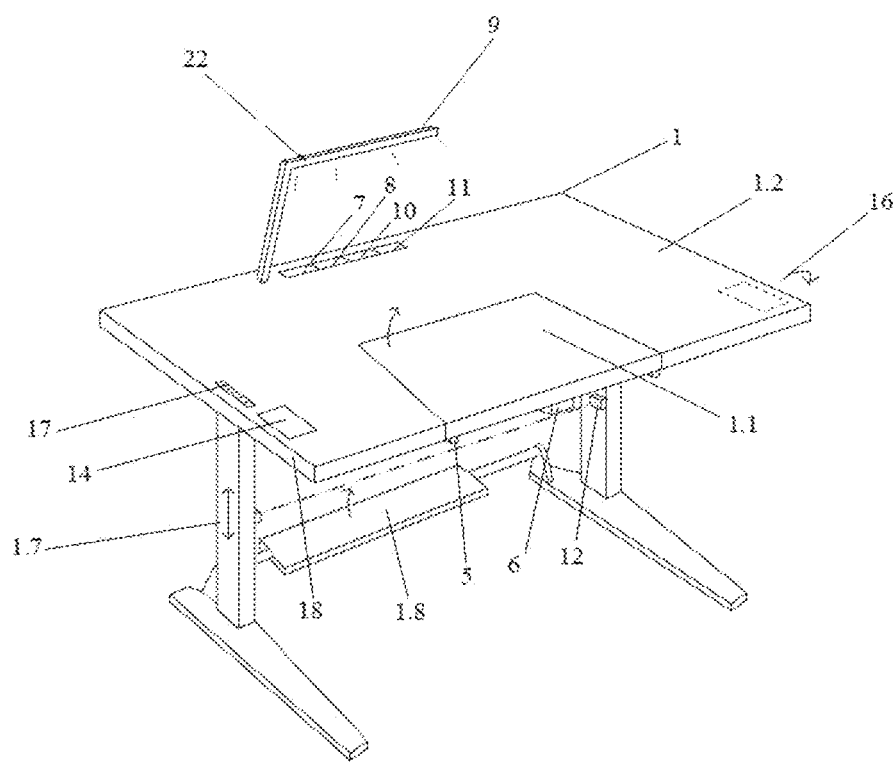
Figure 2:
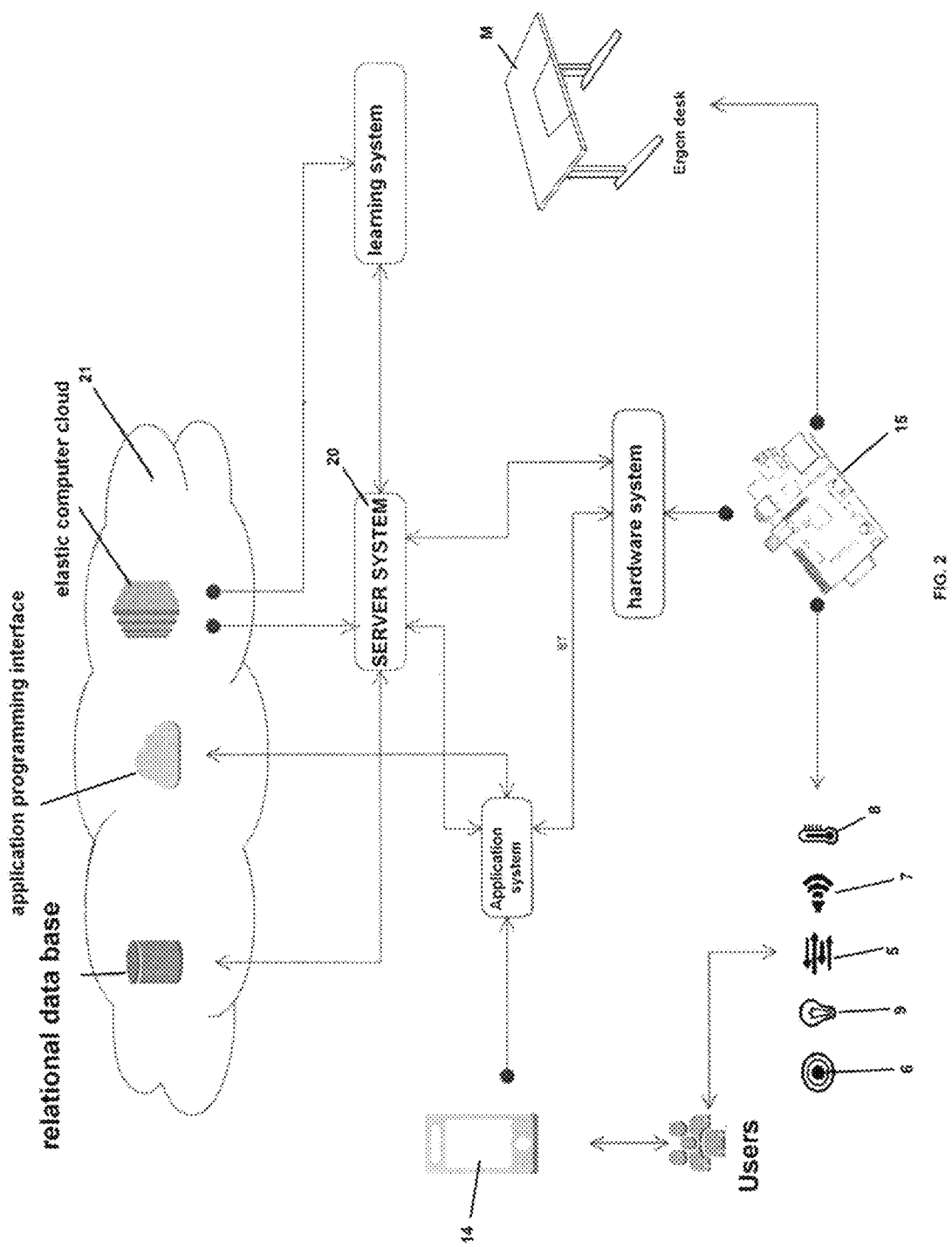

The invention referred to in these specifications consists of a smart office desk which is interactive with the user, based on an individual work desk and several elements of hardware and software applied to it, and comprising mainly the following elements:
  a) a working desktop divided into two zones:
    an "adaptive surface" comprising a desktop section located in front of the user and operated by a linear actuator using a mechanism that allows it to be tipped.
    a general working surface,
    motor-driven legs which raise and lower the desktop to different working heights,
    a tray for foot support, with different height and leaning adjustments.
  b) A series of sensors integrated into the desktop structure and in the legs, particularly:
    distance sensors,
    presence sensors,
    environmental noise sensors,
    temperature sensors,
    light sensors,
    smoke-detector sensors,
    IR barrier leg sensors,
    a radio-frequency receiver (NFC),
    a row of LEDs,
    current and charge takeoffs,
    a LED light-fitting integrated into the desk.
  c) a CPU unit with touch-screen. The desk (M) integrates a high-resolution touch-screen, presenting an interface to the user from which to control his or her personal data, adjust the desk elements, consult personal information to which the system has access (agenda, health data, information on events, etc.) and manage its configuration from the work station. It includes, among other elements, an on-screen keyboard, commands to activate the desk's mobile elements, graphs of activity, time planning and use statistics, the configuration of the user's settings, joint information from several interconnected desks and information on other applications and functionalities external to the system which may be coordinated with it.
  d) a hardware system allowing physical connection of the integrated sensors and linear actuators with a microcontroller,
  f) a hardware system which gathers data (formed by various sensors), a series of linear actuators and a built-in central computer, along with the physical connection between them.
  g) a server system containing the software that controls the communication between all other systems and which receives, stores, analyses and processes the information coming from each work station.
  h) an algorithmic system for decision-making and the generation of recommendations in real time using artificial intelligence and machine learning techniques.
  i) an interactive software application allowing the user access to all the table's functionalities and statistics, while allowing the system to transmit in real time to the user its recommendations and the various events on his or her agenda.

At the technological level, the invention consists of a desktop controlled by a computer system which receives as inputs data about the user data and his working environment, returning outputs in the form of recommendations to the user, automatic implementation of actions on them (following prior consent), along with statistics based on the data analysed and which the user is able to consult.

The data from the inputs comes from three different sources:
  data gathered using the table sensors,
  data gathered through user's interaction with the built-in application, and
  data the system reads from other sources and applications external to it, such as calendar data, meetings and other work activities, electronic devices such as smartphones, wearables and the like which can be connected to the system and provide information on the user's behaviour and habits before and during the workday.
There are three types of output:
  In the first place and in line with the statistical models describing the user using the desk, the system sends them specific proposals in the form of a daily work schedule. Said proposals include the following:
    (i) periods of work standing,
    (ii) periods of work sitting,
    (iii) rest or "break" periods,
    (iv) changes associated with the slope of the "adaptive surface" and
    (v) changes associated with the foot tray position.
  In the second place, the system occasionally implements actions directly, which can be stopped or reversed by the user should they wish, and includes changes in the angles of the "adaptive surface" and footrest tray.
  Thirdly, as output, the system displays information on the use of the desk including the following:
    individual use statistics—the total time during which the user has worked standing, sitting, the number and length of rest periods, preferred working positions, . . . —broken down to show time patterns (correlation with the day of the week, the time of day, . . . ); and
    accumulated statistics on various users and working teams—not available to all individual users, but displayed/delivered solely to certain users of the system with rights as "administrator" or "manager".

The main benefit of this invention is to ensure that the user's hours of work are the healthiest for them, and more efficient. It is hard for personal and human intuition to compete with statistics and computation using massive amounts of data.

Until now, the level of adaptation an office desk offered its users was—in some cases—limited to adjusting its height, manually or electronically, and the user had to decide when and how to do so. With the automatic, systematic collection of data and measurements of the user's conduct and habits at the office desk throughout the day, and their movement in space and reaction to proposals presented sequentially, it is possible to construct a statistical model which describes and exploits the patterns and problems revealed by the user's behaviour. Because people's conduct varies, and statistical models are not exact but rather operate on intervals of confidence, the system continuously updates all the parameters that represent the user profile, hence, adapting to his changes over time.

For the first time, a system has been created which is able to learn about the features of the conduct of a user in an office and apply this knowledge to optimise the working guidelines targeting a more efficient and healthy fulfillment of objectives.

Moreover, the system is designed to use not just individual learning of the working habits of each individual user, but also to apply procedures for the aggregation of knowledge and learning across different users. Similarly, the system is able to cluster users in groups according to their similarity and to apply the knowledge learned about groups of users to enhance the experience of others in real time, and to foresee and prevent problems already suffered by their colleagues. By grouping patterns of conduct and designing user profiles, the system is able to provide each user with better and more adequate recommendations according to his own characteristics.

A fundamental advantage of this "collaborative" aspect is to reduce the impact of the problem known in Artificial intelligence as "cold start", according to which a user's initial experience is very negative because the system does not initially have any information on which to base its decisions.

DESCRIPTION OF THE PREFERRED EMBODIMENT

The invention described in these specifications refers to a Smart Office Desk Interactive with the User based on an individual work desk (M) and various hardware and software elements applied to it and comprising mainly the following elements:

a) A work desktop (1) divided into two zones:
   an "adaptive surface" (1.1) comprising a section of the desktop of dimensions approximately 800×600 mm facing the user and operated by a linear actuator using a mechanism enabling it to be inclined.
   a general work surface (1.2),
   motor-driven legs (1.7) to raise and lower the desktop (1) to different working heights,
   A footrest tray (1.8), with different height and inclination possibilities, b) A series of sensors integrated into the structure of the desktop and into the legs, particularly:
   distance sensors (5)
   presence sensors (6)
   environmental noise sensors (7)
   temperature sensors (8)
   light sensors (9)
   humidity sensors (10)
   smoke-detector sensors (11)
   IR barrier leg sensors (12)
   a radio-frequency receiver (NFC) (16)
   a row of LEDs (17)
   current and charge takeoffs (18).
   a LED light-fitting (22) integrated into the desk.

c) a CPU unit with touch-screen (14). The desk (M) integrates a high-resolution touch-screen, presenting an interface to the user from which to control his or her personal data, adjust the desk elements, consult personal information to which the system has access (agenda, health data, information on events, etc.) and manage its configuration from the work station. It includes, among other elements, an on-screen keyboard, commands to activate the desk's mobile elements, graphs of activity, time planning and use statistics, the configuration of the user's personal parameters, joint information from several interconnected desks and information on other applications and functionalities external to the system which may be coordinated with it.

d) a hardware system allowing physical connection of the integrated sensors and linear actuators with a microcontroller (15), made up fundamentally of the following:

d.1. distance sensors (5) permanently measuring the distance from the user to the table and combined together, to position the user relative to the working desktop. These distance measurements, made every few seconds, are sent to the server system for inclusion in its statistics.

d.2. a presence sensor (6) used to detect when someone is using the table. The user's presence is detected with a thermopile sensor able to measure the temperature of an object placed in front of the sensor from the infrared radiation it emits as a result of its temperature. The presence data is used to detect when the user leaves the work station and when he returns to it. Also, at the start of the working day, the system detects the presence of a new user and asks him to log in.

d.3. a light sensor (9) in the form of an ambient light sensor comprising two photodiodes, one broad spectrum and the other of red-infrared radiation which, using the signal they produce and depending on the amount of light they receive in the spectrum to which they are sensitive, can estimate the light output at the user's post, in units of lux. This ambient light level is monitored to gather data on the working environment and to make automatic adjustments to light sources such as a desk lamp integrated into the table.

d.4. an environmental noise sensor (7), using a sound power meter, based on the signal from a microphone which is processed to calculate the sound power level in decibels using an appropriate calibration of the sensor. This measurement makes it possible to analyse the noise in the environment to obtain hourly, weekly statistics, etc.

d.5. NFC (16): the desk (M) integrates an NFC radiofrequency receiver, making it possible to start a session in the system and complete actions, and which can be used with any NFC-enabled device such as contactless cards, intelligent telephones, coded keyholders, etc. In addition to performing actions (start of session, end of session, etc.) in the actual system in the invention, the authentication based on this system can be used to connect with other company register processes and to monitor work attendance or office arrivals.

d.6. LEDs (17): the desk (M) integrates a set of LEDs which offer instantaneous data (low complexity) to the user on various parameters of his work. This information is displayed by varying the LED colour and brightness, the latter possibly dependent on the intensity of the ambient light.

d.7. Current and charge takeoffs (18): the desk (M) integrates a series of mains current takeoffs, available to the user, and charge sockets designed to offer simple, wireless charging for any user portable electronic device.

d.8. Infrared Leg Barriers (12) in the form of a set of IR barriers able, together or individually, to measure the position of legs and feet, to complete measurement of the user's working posture.

d.9. A LED light-fitting (22) integrated into the desk and self-regulated depending on the ambient light and the user's preferences, and operated as follows:
      Where dictated by the surrounding conditions—the ambient light—and user preferences, the system communicates via Bluetooth with the microcontroller (15) which runs the controller for the light-fitting incorporated, to change the light intensity.

g) A server system which contains the software that organises the communication between all the other systems and which receives, stores, analyses and processes the data from each work station.

The system implements the following architecture:

g.1. A mechanism to deliver and receive the data collected from the desk (M) to the servers, which operates as follows:

The microcontroller (15) used in the sensor system has software which provides a hardware abstraction layer (HAL) allowing the sensors to be started, consultation on their status and the disassociation of a given sensor from a high level, in terms of the multilayer architecture making up the technology of the table (M).

This software is implemented in a routine or daemon in the operating system of the microcontroller (15), with three functionalities:

To start the routine.
To stop the routine.
To consult the series of states of the sensors and to send these states to a remote server in the cloud (21) which receives and processes these states.

The cloud (21), is a elastic computer cloud with Application Programming Interface and relational data base This information is formed into a measurement, and the action to collect the measurement and deliver it to the remote server is what is known as "to measure".

This routine remains inactive, at rest, until the presence of an individual is detected at the position for use of the desk (M).

At that point, the user measurement routine begins every given length of time.

These measurements are delivered and collected by the Server system (20) housed in the cloud (21). When these measurements are stored in the data base, they are linked to the identity of the user logged into the system, if their identity is known. If not, the measurements are stored temporarily, without identification, while the user is asked to complete the login process.

The user's interaction for their identification can take two forms:

The first is to start the session manually with a standard login system, by means of username and password. Manual session start is managed through the tactile device whose virtual keyboard enables a username and password to be introduced. This device is linked by Bluetooth to the microcontroller (15) at each work station, which is also able to handle a routine for reception and forwarding of messages. The device encapsulates the login data, communicating them to the microcontroller (15), which associates the measurements being taken on the user.

The second option is identification using a near-field communication card (NFC) where the session is started with a card using a reader connected to the microcontroller (15) which undertakes to communicate both to the Server system (20) via the Internet and to the tactile device at the post, by Bluetooth.

These measurements are communicated using the REST protocol ("Representational State Transfer") to the server system housed in the cloud (21).

g.2. A data-processing mechanism operating as follows:

The server system (20) processes the data collected, assigning them a single timestamp while also linking those data to a single user known to the system.

After encapsulating the tuple (user, timestamp) along with the measurement data, it is stored in the data base.

Erroneous measurements are discarded in this process.

The data base is deployed in an external server (20). An interface is used for the permanence of the data between server system and data base.

Every certain period of time, all the measurements taken on a user are consulted and the data analysed, a process is run to detect anomalies, prior to conclusions and making pertinent decisions, which are then forwarded to the user.

g.3. A mechanism for delivery of actions from the servers (20) to the desk (M), which operates as follows:

When the system decides to run an action on the table (M), depending on the type of action, the server (20) in the cloud must deliver it to the microcontroller (15) or to the touch-screen (14) where the native application is found.

An example of the first type of action is to tip the adaptive surface, while the second type includes the reprogramming of a user's programmes.

In both cases, the standard REST protocol is used for data exchange.

h) An algorithmic system for decision-making and the generation of recommendations in real time, using artificial intelligence and machine learning techniques. The system proceeds on the basis of the following ideas:

The system learns from users, by summarising the activity and patterns of each, with a statistical model stored and permanently updated over time.

Initially, use is made of parametric models to define each user's activity by means of a family of probabilistic distributions indexed by one or more parameters. Six are used in the first instance.

The value of those parameters is adjusted for each user to values best representing them and so leading to improved service for them.

The system designs daily work programmes for each user based on the current value of that user's parameters.

The programmes consist of a comprehensive specification of the activity to be carried during a number of hours (or the full day) and are generated stochastically, i.e. two users with identical parameters will receive different programmes, and likewise, one user (assuming that the value of their parameters hasn't changed from one day to another) will receive different programmes on consecutive days.

The value of the randomness in the programmes lies in the fact that if a body becomes accustomed to a fixed work dynamic, that dynamic may become partly ineffective, so that it is preferable to introduce same random variation.

Three aspects are taken into account in generating the programmes:

In the first place, events in the person's schedule away from their work table. During the time for these events other activities are not programmed.

Secondly, expert Ergonomics rules of know-how are introduced, e.g. where a person's daily productivity is substantially improved if they take a 5 minute break for each hour worked.

Thirdly, the particular statistical model representing that user. In line with that model and the person's availability in time during that day, the periods are defined in which they will work while standing, seated . . . .

As already explained, the programme specifies all the activity to be carried on at every moment of the day. Many things may however change during the course of the day. From the user's own schedule—new meetings, cancellation of planned meetings—to the detection of anomalous conduct and the updating of the models. Thus the programme is updated while being run.

At the end of each event in the programme, the user is told which event follows. Should they wish to make the transition, that goes ahead. If on the other hand the user prefers to continue what he or she was doing, or perform some other action, the programme adjusts and the models are updated according to that conduct—using a standard temporal decay for the impact of the actions, because users are not stationary; their patterns of conduct may change over time following more or less lengthy periods.

k) An interactive software application allowing the user access to all the table's functionalities and statistics. It also allows the system to transmit to the user its recommendations in real time, along with the different events on their schedule, and operates as follows:

The tactile device serves as platform and interface for the two-way communication and the interaction between user and system.

On the one hand, the system proposes actions to the user via the interactive application, and gathers and processes the user's responses to those proposals.

On the other hand, the user can ask the application to complete certain physical actions (to raise or lower the legs or the adaptive surface), and for statistics on the system's use, or to modify their personal configuration. The user can also ask through the tactile device to be assigned a working day schedule. In addition, it can supervise, modify or close it from the interactive application.

With the information from their agenda, the measurements collected and the feedback received by the user in the previous planning, a work routine is programmed in the learning system and is returned to the control of the work station which displays it onscreen.

This undertakes to handle the times of change of posture, break times, notify meetings, etc. When the time comes for an event, it is notified by one of the tactile, light or vibration interface systems, and the user must choose one of the options offered to it via the tactile system (non-response understood as a possible user option).

Should an event mean a change in the physical system of the desk (M)—like to raise or lower the legs or alter the slope of the adaptive surface—the tactile system communicates by Bluetooth with the microcontroller (15) and this handles the physical controllers for the changes of position, height or light intensity.

There are events which are not programmed in the routine, e.g. detection of an incorrect posture or an anomaly detected by the sensors. In this case, the microcontroller (15) is responsible for detecting it, communicating it immediately to the server system which consults the learning system, returning the decision made and the actions for implementation or for suggestion to the user to the microcontroller (15) or to the interactive application. Thus, in technological terms, the invention consists of an office desk controlled by a computer system which receives data about the user and the work surroundings as inputs and returns as outputs recommendations to the user, automatic implementation of actions on them, and statistics the user can consult. The input data are from three different sources:
    data gathered by the table sensors,
    data gathered by user's own interaction with the built-in application and,
    finally, data that the system reads from other applications external to the system, such as agenda schedules, job data bases or devices external to the system.

There are three types of output:
    in the first place, and in line with statistical models describing a specific user of the table, this delivers specific proposals to the user in the form of a daily schedule. The proposals include periods of work standing, sitting, rest periods or breaks and changes to the adaptive surface slope.
    secondly, the table sometimes does not ask, rather implementing actions directly.

m) An algorithmic system for learning and recommendations for collaboration. The desk and its sensors are the instrument the system uses to monitor and gather data continuously and precisely, and the fact that the office has several desks implies that the data stored will be more comprehensive and powerful.

The system is able to learn metrics on user communication and team work. Because each desk has presence sensors and an NFC sensor, the system is able to trace the approximate routes taken daily by the users in the office—detecting them as they approach each work station, even if not logged-in—so that statistical models can be used to interpret the level of communication among users.

The system uses clustering algorithms based on graphs with weights to propose daily where it would be useful for each user to sit.

It must be noted that the proposal is not necessarily a specific spot at a desk but may be a desk or a set of desks nearby. Additional information used for these purposes is extracted from calendars, including meetings for that day, and which users will be at each meeting.

The algorithms also take account of metrics such as the centrality of a vertex in a graph, and attempt to minimise the average distance of users who tend to move more or create more movements.

Having sufficiently described the nature of the invention and its practical implementation, it must be recorded that the specifications indicated above and represented in the attached drawings may be modified in detail provided that this does not alter their fundamental principles established in the previous paragraphs and summarised in the following claims.

The invention claimed is:

1. A user interactive smart office desk, defined by an individual work desk having several hardware and software elements, characterized by the hardware elements of the interactive smart office desk consisting of the following:
    a) a work desktop divided into two zones; the first zone being an adaptive surface comprising a section of dimensions approximately 800 ×600 mm that face a user, and which is operated by a rear linear actuator using a mechanism allowing for a fixed angular elevation; and the second zone being a general work surface; wherein the user interactive smart office desk further includes:
        1) motor driven legs which raise and lower the work desktop to different working heights; and
        2) a footrest tray with different height and inclination possibilities; and
    b) a series of elements that are integrated into the work desktop and into the legs, particularly:
        1) distance sensors;
        2) presence sensors;
        3) environmental noise sensors;
        4) temperature sensors;
        5) light sensors;
        6) humidity sensors;
        7) smoke detector sensors;

8) IR barrier leg sensors;
9) a radio frequency receiver;
10) a row of LED's;
11) current and charge takeoffs; and
12) an LED light-fitting integrated into the desk.

* * * * *